US011619948B2

(12) United States Patent
Xu et al.

(10) Patent No.: US 11,619,948 B2
(45) Date of Patent: Apr. 4, 2023

(54) CONTROL METHOD OF MOBILE ROBOT, MOBILE ROBOT, AND STORAGE MEDIUM

(71) Applicant: Keenon Robotics Co., Ltd., Shanghai (CN)

(72) Inventors: Wei Xu, Shanghai (CN); Denghui Lv, Shanghai (CN); Chao Jin, Shanghai (CN); Jingyang Tang, Shanghai (CN)

(73) Assignee: Keenon Robotics Co., Ltd., Shanghai (CN)

( * ) Notice: Subject to any disclaimer, the term of this patent is extended or adjusted under 35 U.S.C. 154(b) by 0 days.

(21) Appl. No.: 17/879,068

(22) Filed: Aug. 2, 2022

(65) Prior Publication Data
US 2022/0374014 A1    Nov. 24, 2022

Related U.S. Application Data

(63) Continuation of application No. PCT/CN2022/071028, filed on Jan. 10, 2022.

(30) Foreign Application Priority Data

Mar. 11, 2021  (CN) .......................... 202110263046.2

(51) Int. Cl.
*G05D 1/02*       (2020.01)
*B60Q 5/00*       (2006.01)
(Continued)

(52) U.S. Cl.
CPC ............. *G05D 1/024* (2013.01); *B60Q 5/005* (2013.01); *G01C 9/06* (2013.01); *G01S 17/08* (2013.01); *G01S 17/89* (2013.01); *G05D 1/0223* (2013.01)

(58) Field of Classification Search
CPC ...... G05D 1/02; G05D 1/0221; G05D 1/0223; G05D 1/0236; G05D 1/024; G01S 17/08; G01S 17/93; G01S 7/40
See application file for complete search history.

(56) References Cited

U.S. PATENT DOCUMENTS 5,714,928 A * 2/1998 Sudo ..................... G01S 17/931
340/904
2008/0086248 A1* 4/2008 Lu ....................... B60T 8/17552
701/41

(Continued)

FOREIGN PATENT DOCUMENTS

CN        1800780 A      7/2006
CN     103837139 A      6/2014
(Continued)

OTHER PUBLICATIONS

First Office Action issued in counterpart Chinese Patent Application No. 202110263046.2, dated Apr. 30, 2021.
(Continued)

*Primary Examiner* — Tan Q Nguyen
(74) *Attorney, Agent, or Firm* — Westbridge IP LLC

(57) ABSTRACT

Disclosed are a control method of a mobile robot, a mobile robot, and a storage medium. The method includes: when distance information obtained by a laser radar has an effective distance change, predicting an inclination angle of a forward road section relative to a current road surface where the mobile robot is currently located; determining a slope of the forward road section based on the inclination angle and a pitch angle; controlling movement of the mobile robot based on the slope and a result of comparison between the slope and a slope threshold preset by the mobile robot; and marking the forward road section as a slope area on a slope map, where the slope map is used to control, based on the slope area when the mobile robot passes by the slope area, the mobile robot to send climbing warning information.

19 Claims, 4 Drawing Sheets

(51) Int. Cl.
*G01C 9/06* (2006.01)
*G01S 17/08* (2006.01)
*G01S 17/89* (2020.01)
*G01S 17/93* (2020.01)

(56) References Cited

U.S. PATENT DOCUMENTS

| | | | | |
|---|---|---|---|---|
| 2011/0248880 A1* | 10/2011 | Miyahara | ............ | G01S 7/4802 342/54 |
| 2015/0151669 A1* | 6/2015 | Meisner | ............ | B60Q 1/10 701/49 |
| 2019/0001978 A1 | 1/2019 | Takaki | | |

FOREIGN PATENT DOCUMENTS

| | | | |
|---|---|---|---|
| CN | 104950313 | A | 9/2015 |
| CN | 106338285 | A | 1/2017 |
| CN | 106646508 | A | 5/2017 |
| CN | 109387855 | A | 2/2019 |
| CN | 109540162 | A | 3/2019 |
| CN | 109848997 | A | 6/2019 |
| CN | 111458722 | A | 7/2020 |
| CN | 112684803 | A | 4/2021 |
| CN | 113433939 | A | 9/2021 |
| JP | 2010127846 | A | 6/2010 |
| JP | 2011232230 | A | 11/2011 |
| JP | 5775632 | B2 | 9/2015 |
| WO | 2019107550 | A1 | 6/2019 |

OTHER PUBLICATIONS

International Search Report issued in corresponding PCT Application No. PCT/CN2022/071028, dated Apr. 6, 2022.
Written Opinion issued in corresponding PCT Application No. PCT/CN2022/071028, dated Apr. 6, 2022.

* cited by examiner

CONTROL METHOD OF MOBILE ROBOT, MOBILE ROBOT, AND STORAGE MEDIUM

CROSS-REFERENCE TO RELATED APPLICATIONS

The present application is a continuation application of International Application No. PCT/CN2022/071028, filed on Jan. 10, 2022, which claims priority to Chinese Patent Application No. 202110263046.2, filed on Mar. 11, 2021. Both applications are incorporated herein by reference in their entireties.

TECHNICAL FIELD

Embodiments of the present application relate to the field of robot technologies, and in particular, to a control method of a mobile robot, a mobile robot, and a storage medium.

BACKGROUND

With the rapid development of robot technologies, mobile robots have been applied in more and more fields. In order to implement motion control and navigation of a mobile robot in an unknown environment, vision-based robot obstacle recognition has attracted much attention, and has become one of research hotspots of mobile robots in recent years.

In the prior art, obstacles in surrounding space are identified via 360° rotational scanning of a laser radar disposed in a lower part of a mobile robot. Since the laser radar is usually at a certain height from the ground, a mobile robot in the prior art cannot obtain road surface information. As a result, the mobile robot can run only on flat ground.

Therefore, how to control the mobile robot to run on a road section having an uphill or a downhill becomes a technical problem needing to be urgently resolved in the prior art.

SUMMARY

Embodiments of the present application provide a control method of a mobile robot, a mobile robot, and a storage medium, thereby enabling the mobile robot to run on a road section having an uphill or a downhill.

According to a first aspect, an embodiment of the present application provides a control method of a mobile robot, where a laser radar and an inertial measurement unit are mounted on the mobile robot; the laser radar is configured to measure a distance from the laser radar to a road surface; the inertial measurement unit is configured to measure a current pitch angle of the mobile robot; and the method includes:

when distance information obtained by the laser radar has an effective distance change, obtaining a fixed distance to a current road surface measured by the laser radar at a first position and a measured distance to a forward road section measured by the laser radar at a second position;

predicting, based on the fixed distance, the measured distance, and an angle parameter of a light beam emitted by the laser radar, an inclination angle of the forward road section relative to the current road surface where the mobile robot is currently located; and determining a slope of the forward road section based on the inclination angle and a pitch angle;

controlling movement of the mobile robot based on the slope and a result of comparison between the slope and a slope threshold of the mobile robot; and marking the forward road section as a slope area on a slope map, where the slope map is used to control, based on the slope area when the mobile robot passes by the slope area, the mobile robot to send climbing warning information.

Optionally, the predicting, based on the fixed distance, the measured distance, and an angle parameter of a light beam emitted by the laser radar, an inclination angle of the forward road section relative to the current road surface where the mobile robot is currently located includes:

determining displacement of the mobile robot from the first position to the second position; and calculating, based on the displacement, the fixed distance, the measured distance, and an included angle between the current road surface and the light beam emitted by the laser radar, the inclination angle of the forward road section relative to the current road surface.

Optionally, the laser radar is a multi-line radar; and the obtaining a fixed distance to a current road surface measured by the laser radar at a first position and a measured distance to a forward road section measured by the laser radar at a second position includes:

obtaining a first fixed distance and a second fixed distance to the current road surface that are measured at the first position respectively by a first light beam and a second light beam emitted by the laser radar; and obtaining a first measured distance and a second measured distance to the forward road section that are measured at the second position respectively by the first light beam and the second light beam emitted by the laser radar;

where the predicting, based on the fixed distance, the measured distance, and an angle parameter of a light beam emitted by the laser radar, an inclination angle of the forward road section relative to the current road surface where the mobile robot is currently located includes:

calculating, based on the first fixed distance, the second fixed distance, the first measured distance, the second measured distance, and an included angle between the first light beam and the second light beam, the inclination angle of the forward road section relative to the current road surface.

Optionally, the slope threshold includes a maximum uphill angle and a minimum downhill angle; and the controlling movement of the mobile robot based on the slope and a result of comparison between the slope and a slope threshold of the mobile robot includes:

determining an uphill downhill status of the forward road section depending on whether a value of the slope is positive or negative, where the uphill downhill status indicates that the forward road section is an uphill road section or a downhill road section;

if the forward road section is the uphill road section, determining whether the slope is less than the maximum uphill angle; and if the slope is less than the maximum uphill angle, controlling the mobile robot to go uphill.

Optionally, the controlling the mobile robot to go uphill includes:

determining a size relationship between the slope and the pitch angle, where the size relationship indicates that the slope is greater than, less than, or equal to the pitch angle; and if the slope is greater than the pitch angle, increasing a tractive force of the mobile robot;

if the slope is less than the pitch angle, increasing a speed of the mobile robot; or if the slope is equal to the pitch angle, keeping the tractive force and the speed of the mobile robot unchanged.

Optionally, the method further includes:

if the forward road section is the downhill road section, determining whether the slope is greater than the minimum downhill angle; and if the slope is greater than the minimum downhill angle, controlling the mobile robot to go downhill.

Optionally, the method further includes:

removing data of a measured distance obtained by the laser radar, which is greater than a distance threshold, and obtaining the distance information by performing fitting.

Optionally, the climbing warning information includes a voice reminder or a light reminder.

Optionally, the method further includes:

when the mobile robot passes by the slope area, updating the slope area if it is determined, based on the inclination angle and the pitch angle, that the forward road section has no slope.

According to a second aspect, an embodiment of the present application provides a control apparatus of a mobile robot, including:

a slope prediction module, configured to: when distance information obtained by a laser radar has an effective distance change, obtain a fixed distance to a current road surface measured by the laser radar at a first position and a measured distance to a forward road section measured by the laser radar at a second position; predict, based on the fixed distance, the measured distance, and an angle parameter of a light beam emitted by the laser radar, an inclination angle of the forward road section relative to a current road surface where the mobile robot is currently located; and determine a slope of the forward road section based on the inclination angle and a pitch angle measured by an inertial measurement unit; and a motion control module, configured to: control movement of the mobile robot based on the slope and a result of comparison between the slope and a slope threshold of the mobile robot; and mark the forward road section as a slope area on a slope map, where the slope map is used to control, based on the slope area when the mobile robot passes by the slope area, the mobile robot to send climbing warning information.

According to a third aspect, an embodiment of the present application provides a mobile robot, including:

a laser radar, configured to measure a distance from the laser radar to a road surface;

an inertial measurement unit, configured to measure a current pitch angle of the mobile robot; and a data processing center, including a memory, a processor, and a computer program stored in the memory and executable by the processor, where the program, when executed by the processor, implements the control method of the mobile robot according to the first aspect.

According to a fourth aspect, an embodiment of the present application provides a computer-readable storage medium, storing a computer program, where the program, when executed by a processor, implements the control method of a mobile robot according to the first aspect.

According to a fifth aspect, an embodiment of the present application provides an electronic device, including a processor, and a memory configured to store an instruction executable by the processor, where the processor is configured to perform the control method of a mobile robot according to the first aspect.

According to the control method and apparatus of the mobile robot, the mobile robot, and the storage medium provided in the embodiments of the present application, when the distance information obtained by the laser radar has the effective distance change, the inclination angle of the forward road section relative to the road surface where the mobile robot is currently located is predicted. The slope of the forward road section is determined based on the inclination angle and the pitch angle. The movement of the mobile robot is controlled based on the slope and the result of comparison between the slope and the slope threshold preset by the mobile robot. Therefore, the mobile robot can run on a road section having an uphill or a downhill, which improves performance of the mobile robot and broadens an application scenario of the mobile robot. In addition, according to the embodiments of the present application, the forward road section may also be marked as the slope area on the slope map. The slope map is used to control, based on the slope area when the mobile robot passes by the slope area, the mobile robot to send the climbing warning information, thereby achieving an objective of reminding a pedestrian and then guaranteeing road traffic safety.

DETAILED DESCRIPTION OF THE EMBODIMENTS

The present application will be further described in detail below with reference to the accompanying drawings and embodiments. It may be understood that the specific embodiments described herein are merely used to explain the present application, but not used to limit the present application. In addition, it is to be noted that, for ease of description, only some but not all of the structures related to the present application are shown in the accompanying drawings.

Figure 1:
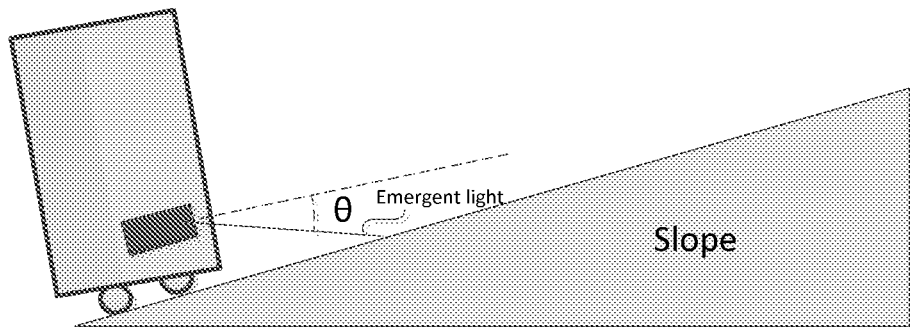
FIG. 1 is a schematic diagram of an application scenario according to an embodiment of the present application.

A main idea of technical solutions of the present application is as follows: For example, FIG. 1 is a schematic diagram of an application scenario according to an embodiment of the present application. As shown in FIG. 1, a laser radar and an inertial measurement unit (IMU) are mounted on a mobile robot. Both the laser radar and the inertial measurement unit are mounted parallel to a chassis of the mobile robot. An included angle between emergent light of the laser radar and the ground is θ. The laser radar is configured to measure a distance from the laser radar to a road surface. The inertial measurement unit is configured to measure a current pitch angle of the mobile robot, namely, an inclination angle of a current road surface. The embodiment of the present application provides a technical solution for controlling movement of the mobile robot. During movement of the mobile robot, distances to forward road sections are detected continuously by the laser radar. Since an angle between a mounting position of the laser radar and corresponding ground is fixed, when the ground is flat, distance values measured by the laser radar are approximately a fixed value. When a slope appears in a forward road section, the distance value changes. Therefore, in the embodiment, the distance value is monitored, and when it is monitored that the distance value changes, the pitch angle of the mobile robot measured by the IMU and the distance value measured by the laser radar are obtained. The slope of the forward road section is predicted based on the pitch angle and the distance value, and movement of the mobile robot is controlled based on a prediction result. In this way, the mobile robot can safely pass through an uphill or a downhill road section, and on the basis of hardware of an existing mobile robot, performance of the mobile robot is improved.

Figure 2:
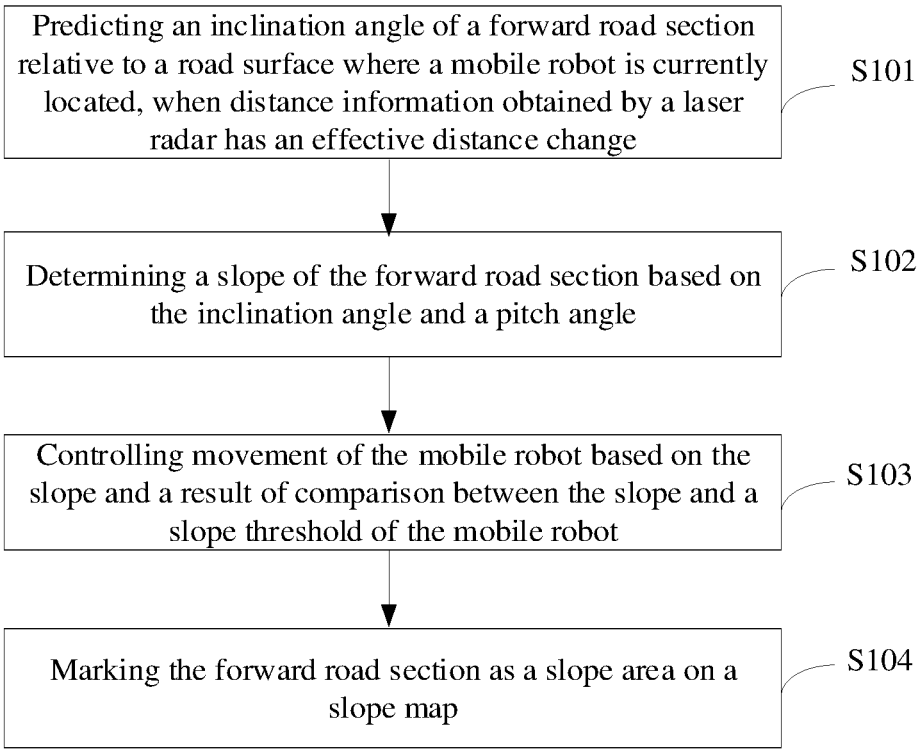
FIG. 2 is a schematic flowchart of a control method of a mobile robot according to an embodiment of the present application.

FIG. 2 is a schematic flowchart of a control method of a mobile robot according to an embodiment of the present application. The method in the embodiment may be performed by a control apparatus of a mobile robot according to the embodiments of the present application. The apparatus may be implemented in a software and/or hardware manner, and may be integrated in the mobile robot. As shown in FIG. 2, the control method of the mobile robot in the embodiment includes the following steps:

S101: predicting an inclination angle of a forward road section relative to a road surface where a mobile robot is currently located, when distance information obtained by a laser radar has an effective distance change.

For example, assuming that when the mobile robot moves on a flat road surface (a current road surface), a distance measured by the laser radar is denoted by $d_0$, a distance measured when the mobile robot goes uphill meets the following formula: $d_1 < d_0$, and a distance measured when the mobile robot goes downhill meets the following formula: $d_2 > d_0$. Similarly, if all distances d measured when the mobile robot moves continuously for a certain distance meet the following formula: $d < d_0$ or $d > d_o$, it may indicate that there is a slope in front of the mobile robot. To ensure that the robot can pass through the slope successfully, in this step, it is necessary to predict the inclination angle of the forward road section relative to the current road surface.

The effective distance change may be used to determine whether the road surface has a slope change. In one aspect, the effective distance change is a change exceeding a certain range or level, for example, a centimeter level. Some slight changes less than a preset threshold or level may be ignored. In another aspect, the effective distance change is a change from distance values obtained via several contiguous times (for example, more than three times) of measurement to a relatively fixed distance value. For example, assuming that a sampling period of the laser radar is 1 second, all distances measured from the 0-5 min of movement of the robot are $d_0$, and ten distance values measured from the $5^{st}$ min of movement of the robot are all less than $d_0$, it is determined that the distances measured by the laser radar have an effective distance change. If two contiguously measured distance values are less than do, and following contiguously measured distance values return to $d_0$, the change may be ignored.

Optionally, in this step, arithmetic elimination may be performed on an abnormal point (for example, a measured distance whose distance value is greater than $10*d_0$) in distances measured by the laser radar. Since a scenario of the robot is basically fixed, if a measured distance is far greater than a distance to a flat road section, there is a high probability that no laser beam is irradiated on the road surface or light interference is caused by a foreign object on the ground. As a result, a measurement result is abnormal. In this case, fitting is performed on measured distances to obtain the distance information. Then, whether there is an effective distance change is determined based on a processing result. Therefore, accuracy of slope determining is improved.

Optionally, in this step, when the distance information measured by the laser radar has the effective distance change, a fixed distance to the current road surface measured by the laser radar at a first position and a measured distance to the forward road section measured by the laser radar at a second position are obtained, and the inclination angle of the forward road section relative to the current road surface is calculated based on the fixed distance and the measured distance.

Specifically, when it is determined that the distance information measured by the laser radar has the effective distance change, one position is selected, as the first position, from positions at which the laser radar measures distances before the effective distance change occurs; a distance value measured by the laser radar at the first position is obtained as the fixed distance; one position is selected, as the second position, from positions at which the laser radar measures distances after the effective distance change occurs; a distance value measured by the laser radar at the second position is obtained as the measured distance; and then actual values of the fixed distance and the measured distance are substituted into a pre-designed algorithm to obtain the inclination angle of the forward road section relative to the current road surface.

Since the laser radar in the embodiments of the present application may be a single-line radar or a multi-line radar, different algorithms are designed in the embodiments of the present application for the single-line radar and the multi-line radar to predict inclination angles, thereby meeting control requirements for mobile robots on which different laser radars are mounted.

(1) Single-line radar

Displacement of the mobile robot from the first position to the second position is determined. The inclination angle of the forward road section relative to the current road surface is calculated based on the displacement, the fixed distance, the measured distance, and a light emission angle. The light emission angle (θ in FIG. 1) is an included angle between a light beam emitted by the laser radar and a flat road surface. Herein, the light emission angle may be an angle parameter of the light beam emitted by the laser radar.

a. A Solution of Going Uphill

Figure 3:
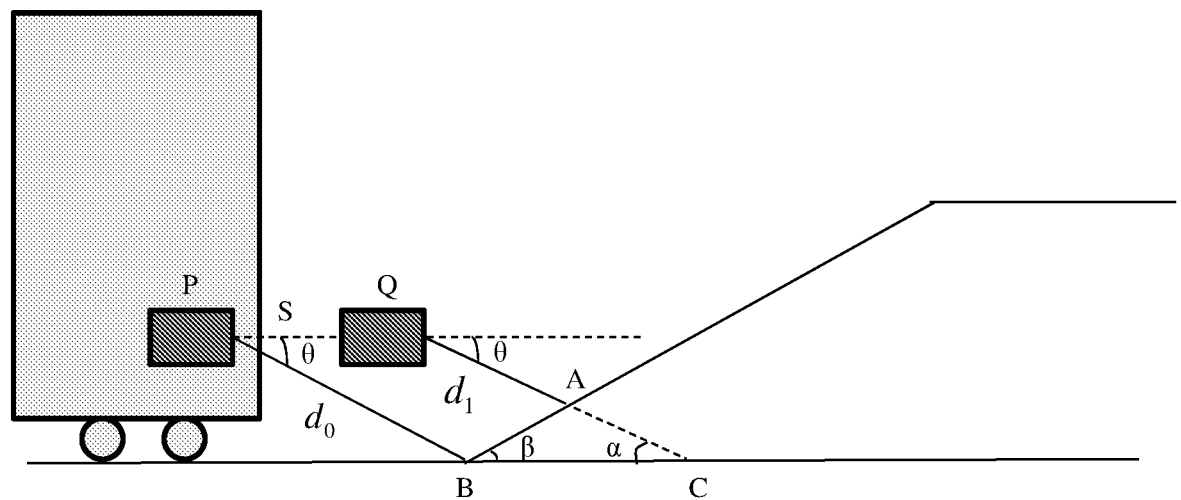
FIG. 3 is a schematic diagram in which a single-line radar-based mobile robot goes uphill according to an embodiment of the present application.

For example, FIG. 3 is a schematic diagram in which a single-line radar-based mobile robot goes uphill according to an embodiment of the present application. It is assumed that, in a process in which the mobile robot moves on the current road surface, a distance (the fixed distance) to the current road surface measured by the laser radar at the first position (point P) is denoted by $d_0$, a distance (the measured distance) to the forward road section measured at the second position (point Q) is denoted by $d_1$, the displacement of the mobile robot from the first position to the second position is denoted by S, and the light emission angle is denoted by θ, that is, PQ=S, PB=$d_0$, and QA=$d_1$.

In the parallelogram PQCB, it may be learned according to the parallelogram rule that: BC=PQ=S, AC=QC−QA=PB−QA=$d_0$−$d_1$, and ∠α=∠θ.

In the triangle ABC, it may be learned according to the law of cosines and the law of sines that:

$$AB^2=BC^2+AC^2-2*|BC|*|AC|*\cos\alpha \quad (1)$$

$$AB/\sin\alpha=AC/\sin\beta \quad (2)$$

Values of BC, AC, and α are substituted into the foregoing formulas (1) and (2) for solving to obtain a value of (β, namely, a value of the inclination angle of the forward road section relative to the current road surface.

Whether the value of (β is positive or negative is defined as follows: If the fixed distance is greater than the measured distance, the value of (β is positive; and if the fixed distance is less than the measured distance, the value of β is negative. For example, in FIG. 3, when the side PB is greater than QA, the value of (β is positive; and when the side PB is less than QA, the value of β is negative.

b. A Solution of Going Downhill

Figure 4:
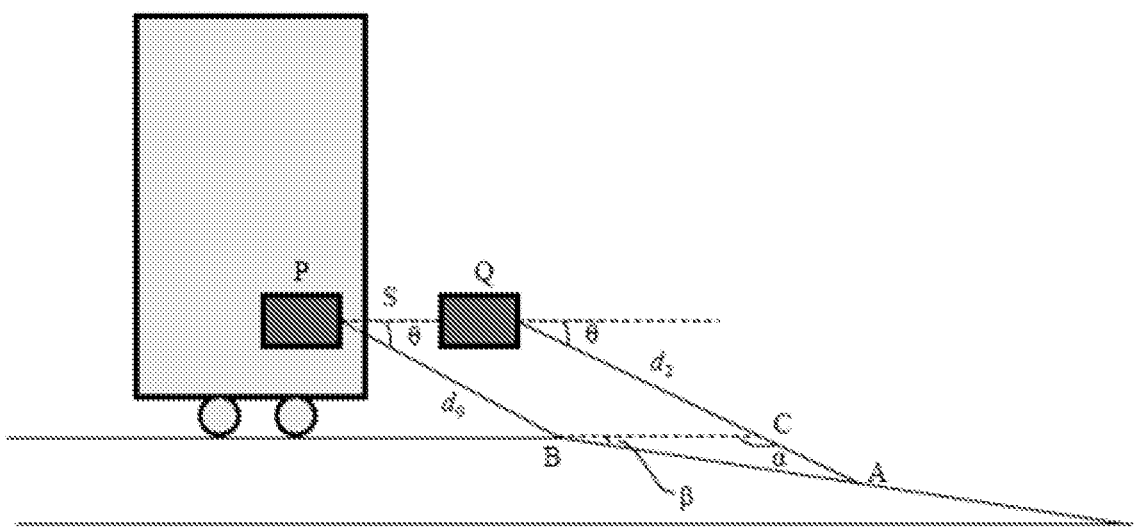
FIG. 4 is a schematic diagram in which a single-line radar-based mobile robot goes downhill according to an embodiment of the present application.

For example, FIG. 4 is a schematic diagram in which a single-line radar-based mobile robot goes downhill according to an embodiment of the present application. It is assumed that, in a process in which the mobile robot moves on the current road surface, a distance (the fixed distance) to the current road surface measured by the laser radar at the first position (point P) is denoted by $d_0$, a distance (the measured distance) to the forward road section measured at the second position (point Q) is denoted by $d_2$, the displacement of the mobile robot from the first position to the second position is denoted by S, and the light emission angle is denoted by θ, that is, PQ=S, PB=$d_0$, QA=$d_2$, BC=PQ=S, QC=PB=$d_0$, AC=QC−QA=$d_0$−$d_2$, and ∠α=180°−∠θ.

In the triangle ABC, it may be learned according to the law of cosines and the law of sines that:

$$AB^2=BC^2+AC^2-2|BC|*|AC|*\cos\alpha \quad (3)$$

$$AB/\sin\alpha=AC/\sin\beta \quad (4)$$

Values of BC, AC, and α are substituted into the foregoing formulas (3) and (4) for solving to obtain a value of (β, namely, a value of the inclination angle of the forward road section relative to the current road surface.

A manner of defining whether the value of β is positive or negative is the same as that in the foregoing description. Details are not described herein again.

It should be noted that, in a possible implementation, in the foregoing solutions of going uphill and going downhill based on the single-line radar, point P is a position of the mobile robot corresponding to an intersection point of a slope change.

In a running process of the mobile robot, the laser radar collects distance information to the ground in real-time according to a certain frequency, to obtain much distance data and corresponding position data of the mobile robot. Therefore, the intersection point of the slope change is identified by analyzing the distance data, for example, the point B in FIG. 3 and FIG. 4. Then, the position of the mobile robot corresponding to the intersection point of the slope change is obtained. The inclination angle of the forward road section relative to the current road surface may be calculated by taking the position as point P and using the foregoing corresponding calculation method.

(2) Multi-line radar

A first fixed distance and a second fixed distance to the current road surface that are measured at the first position respectively by a first light beam and a second light beam emitted by the laser radar are obtained. A first measured distance and a second measured distance to the forward road section that are measured at the second position respectively by the first light beam and the second light beam emitted by the laser radar are obtained. The inclination angle of the forward road section relative to the current road surface are calculated based on the first fixed distance, the second fixed distance, the first measured distance, the second measured distance, and a beam angle. The beam angle is an included angle between the first light beam and the second light beam. Herein, the beam angle may be an angle parameter of the light beam emitted by the laser radar.

a. A Solution of Going Uphill

Figure 5:
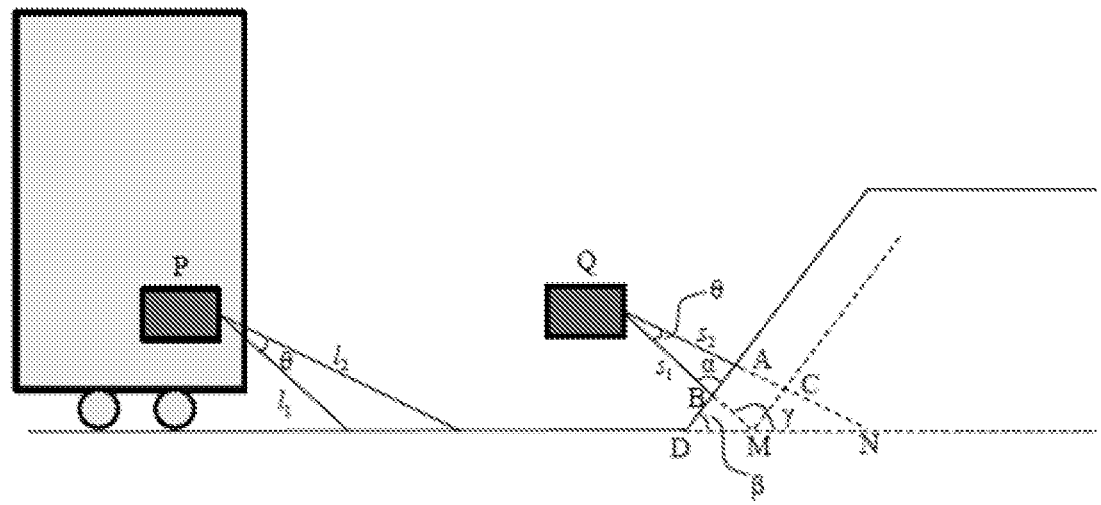
FIG. 5 is a schematic diagram in which a multi-line radar-based mobile robot goes uphill according to an embodiment of the present application.

For example, FIG. 5 is a schematic diagram in which a multi-line radar-based mobile robot goes uphill according to an embodiment of the present application. It is assumed that, in a process in which the mobile robot moves on the current road surface, distances (the fixed distances) to the current road surface that are measured at the first position (point P) respectively by a first light beam and a second light beam emitted by the laser radar are respectively denoted by $l_1$ and $l_2$, an included angle (the beam angle) between the first light beam and the second light beam is denoted by θ, distances (the measured distances) to the forward road section that are measured at the second position (point Q) respectively by the first light beam and the second light beam emitted by the laser radar are respectively denoted by $s_1$ and $s_2$, and the beam angle is unchanged, that is, QB=$s_1$, QA=$s_2$, QM=$l_1$, QN=$l_2$, ∠AQB=∠NQM=∠θ, ∠QMC=∠QBA=∠α, and ∠CMN=∠ADN=∠β.

In the triangle QAB, it may be learned according to the law of cosines and the law of sines that:

$$AB^2=QA^2+QB^2-2*QA*QB*\cos\theta \quad (5)$$

$$AB/\sin\theta=QA/\sin\alpha \quad (6)$$

Values of QA, QB, and θ are substituted into the foregoing formulas (5) and (6) to obtain a value of α.

In the triangle QMN, it may be learned according to the law of cosines and the law of sines that:

$$MN^2=QM^2+QN^2-2*QM*QN*\cos\theta \quad (7)$$

$$MN/\sin\theta=QN/\sin\gamma \quad (8)$$

$$\gamma=\alpha+\beta \quad (9)$$

Values of QM, QN, and α are substituted into the foregoing formulas (7) to (9) for solving to obtain a value of (β, namely, a value of the inclination angle of the forward road section relative to the current road surface.

A manner of defining whether the value of β is positive or negative is the same as that in the foregoing description. Details are not described herein again.

b. A solution of going downhill

Figure 6:
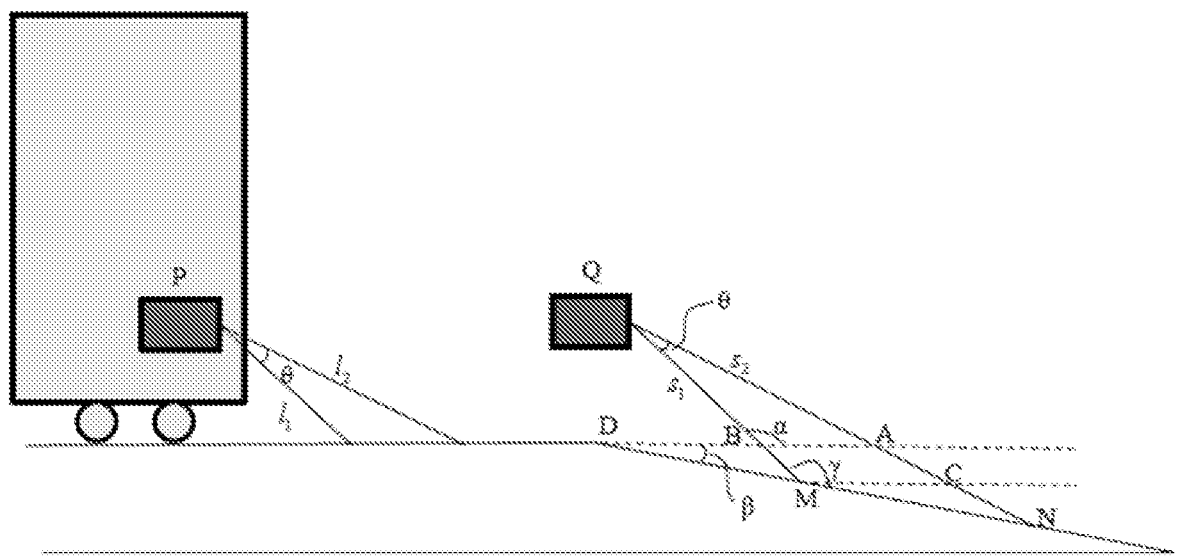
FIG. 6 is a schematic diagram in which a multi-line radar-based mobile robot goes downhill according to an embodiment of the present application.

For example, FIG. 6 is a schematic diagram in which a multi-line radar-based mobile robot goes downhill according to an embodiment of the present application. It is assumed that, in a process in which the mobile robot moves on the current road surface, distances (the fixed distances) to the current road surface that are measured at the first position (point P) respectively by a first light beam and a second light beam emitted by the laser radar are respectively denoted by $l_1$ and $l_2$, an included angle (the beam angle) between the first light beam and the second light beam is denoted by θ, distances (the measured distances) to the forward road section that are measured at the second position (point Q) respectively by the first light beam and the second light beam emitted by the laser radar are respectively denoted by $s_1$ and $s_2$, and the beam angle is unchanged, that is, QM=$s_1$, QN=$s_2$, QB=$l_1$, QA=$l_2$, ∠AQB=∠NQM=∠θ, ∠QMC=∠QBA=∠α, and ∠CMN=∠ADN=∠β.

In the triangle QAB, it may be learned according to the law of cosines and the law of sines that:

$$AB^2=QA^2+QB^2-2*QA*QB*\cos\theta \quad (10)$$

$$AB/\sin\theta=QA/\sin\alpha \quad (11)$$

Values of QA, QB, and θ are substituted into the foregoing formulas (10) and (11) to obtain a value of α.

In the triangle QMN, it may be learned according to the law of cosines and the law of sines that:

$$MN^2=QM^2+QN^2-2*QM*QN*\cos\theta \quad (12)$$

$$MN/\sin\theta=QN/\sin\gamma \quad (13)$$

$$\gamma=\alpha+\beta \quad (14)$$

Values of QM, QN, and α are substituted into the foregoing formulas (12) to (14) for solving to obtain a value of (β, namely, a value of the inclination angle of the forward road section relative to the current road surface.

A manner of defining whether the value of β is positive or negative is the same as that in the foregoing description. Details are not described herein again.

S102: determining a slope of the forward road section based on the inclination angle and a pitch angle.

In this step, the slope of the forward road section is determined based on the inclination angle calculated in Step S101 and a pitch angle measured by the IMU. The slope of the forward road section is an inclination angle of the forward road section relative to a flat road surface. A value of the slope may also be positive or negative. A positive value of the slope indicates that the forward road section is an uphill road section. A negative value of the slope indicates that the forward road section is a downhill road section.

Optionally, in the embodiment, the slope of the forward road section is determined according to the following formula:

$$\Sigma=\beta+\delta \quad (15)$$

where Σ denotes the slope, δ denotes the pitch angle, and β denotes the inclination angle.

It may be understood that a value of the pitch angle δ may also be positive or negative. When the road surface where the mobile robot is currently located is an uphill road section, the value of δ is positive. When the road surface where the mobile robot is currently located is a downhill road section, the value of δ is negative.

S103: controlling movement of the mobile robot based on the slope and a result of comparison between the slope and a slope threshold of the mobile robot.

In this step, whether the robot can move forward is determined based on the slope of the forward road section determined in Step S102 and climbing performance of the mobile robot. If it is determined that the robot can move forward, the mobile robot is controlled to go uphill or downhill. If it is determined that the robot cannot move on, the mobile robot is controlled to brake or go back the same way.

The climbing capability is a capability of the mobile robot to go uphill or downhill determined according to a hardware condition and a mechanical property of the mobile robot, and may be described via the slope threshold or maximum output kinetic energy.

The following uses the slope threshold as an example. It is assumed that the slope threshold includes a maximum uphill angle and a minimum downhill angle. In the embodiment, first, an uphill downhill status of the forward road section is determined depending on whether a value of the slope is positive or negative. If the value of the slope is positive, it indicates that the forward road section is an uphill road section. If the value of the slope is negative, it indicates that the forward road section is a downhill road section. If the value of the slope is zero, it indicates that the forward road section is a flat road section. Further, the mobile robot is controlled to go uphill or downhill based on the uphill downhill status of the forward road section. A specific process is as follows:

(1) If the forward road section is an uphill road section, whether the slope is less than the maximum uphill angle is determined. If the slope is not less than the maximum uphill angle, it indicates that the slope of the forward road section exceeds the climbing capability of the mobile robot. In this case, if the mobile robot continues going uphill, safety accidents such as slipping may be caused, so that the mobile robot needs to be controlled to brake or go back the same way. If the slope is less than the maximum uphill angle, the mobile robot is controlled to go uphill.

In the embodiment, a speed, a tractive force, or the like of the mobile robot may be controlled based on a change status of the slope, to control the mobile robot to go uphill safely and efficiently. In a possible implementation, in the embodiment, a size relationship between the slope and the pitch angle is determined. The size relationship indicates that the slope is greater than, less than, or equal to the pitch angle. If the slope is greater than the pitch angle, it indicates that the slope becomes steeper. In this case, the tractive force of the mobile robot needs to be increased to ensure that the mobile robot can go uphill successfully. If the slope is less than the pitch angle, it indicates that the slope becomes gentler. In this case, the speed of the mobile robot may be appropriately increased to enable the mobile robot to pass through the slope quickly. If the slope is equal to the pitch angle, it indicates that the slope has no change. In this case, the tractive force and the speed of the mobile robot may be kept unchanged.

(2) If the forward road section is a downhill road section, whether the slope is greater than the minimum downhill angle is determined. If the slope is not greater than the maximum uphill angle, it indicates that the slope of the forward road section exceeds the climbing capability of the mobile robot. In this case, if the mobile robot continues going downhill, safety accidents such as slipping may be caused, so that the mobile robot needs to be controlled to brake or go back the same way. If the slope is greater than the minimum downhill angle, the mobile robot is controlled to go downhill.

In the embodiment, a speed, a tractive force, or the like of the mobile robot may be controlled based on a change status of the slope, to control the mobile robot to go downhill safely and efficiently. In a possible implementation, in the embodiment, a size relationship between the slope and the pitch angle is determined. The size relationship indicates that the slope is greater than, less than, or equal to the pitch angle. If the slope is greater than the pitch angle, it indicates that the slope becomes gentler. In this case, the tractive force of the mobile robot may be appropriately increased to guarantee power required for movement of the mobile robot. If the slope is less than the pitch angle, it indicates that the slope becomes steeper. In this case, the speed of the mobile robot needs to be decreased to guarantee safety of the mobile robot. If the slope is equal to the pitch angle, it indicates that the slope has no change. In this case, the tractive force and the speed of the mobile robot may be kept unchanged.

(3) If the forward road section is a flat road section, a size relationship between the slope and the pitch angle is determined. The size relationship indicates that the slope is greater than or less than the pitch angle. If the slope is greater than the pitch angle, the tractive force of the mobile robot may be increased to provide enough power for movement of the mobile robot on the flat road section. If the slope is less than the pitch angle, the speed of the mobile robot may be appropriately increased to ensure that the mobile robot can pass through the flat road section quickly.

It should be noted that, in the foregoing implementation, each of values of the pitch angle, inclination angle, and slope has a plus or minus sign. Therefore, during size comparison, each value has a plus or minus sign.

S104: marking the forward road section as a slope area on a slope map.

The mobile robot in the embodiment has a slope information learning capability. In a walking process of the mobile robot, a data processing center disposed in the mobile robot may generate a slope map based on a slope status of a road section by which the mobile robot passes. The slope map includes a slope area, a flat road section area, an unmarked area, or the like. When the mobile robot passes by the slope area, the mobile robot is controlled to send climbing warning information based on the slope area. The climbing warning information may be a voice reminder, a light reminder, or the like, for example, "Beware. The robot is going uphill.", thereby achieving an objective of reminding a pedestrian and then guaranteeing road traffic safety.

It may be understood that the slope of the ground also changes dynamically because of construction or another reason. Therefore, when the mobile robot passes by a marked slope area on the slope map, if it is determined, based on the measured inclination angle and pitch angle, that the forward road section actually has no slope, the slope area of the slope map is updated, thereby improving accuracy and practicability of the slope map, and further improving control accuracy of the mobile robot.

Optionally, slope information such as slope value, uphill or downhill, and slope length may also be marked for the slope area on the slope map. Therefore, whether the mobile robot passes by the slope area may be determined based on the slope map and a positioning technology. When it is determined that the mobile robot passes by the slope area, movement of the mobile robot is controlled based on the slope information, so that the mobile robot adjusts a running speed in advance to improve an intelligence degree of the mobile robot.

In the embodiment, when the distance information obtained by the laser radar has the effective distance change, the inclination angle of the forward road section relative to the road surface where the mobile robot is currently located is predicted. The slope of the forward road section is determined based on the inclination angle and the pitch angle. The movement of the mobile robot is controlled based on the slope and the result of comparison between the slope and the slope threshold preset by the mobile robot. Therefore, the mobile robot can run on a road section having an uphill or a downhill, which improves performance of the mobile robot and broadens an application scenario of the mobile robot. In addition, according to the embodiments of the present application, the forward road section may also be marked as the slope area on the slope map. The slope map is used to control, based on the slope area when the mobile robot passes by the slope area, the mobile robot to send the climbing warning information, thereby achieving an objective of reminding a pedestrian and then guaranteeing road traffic safety.

Figure 7:
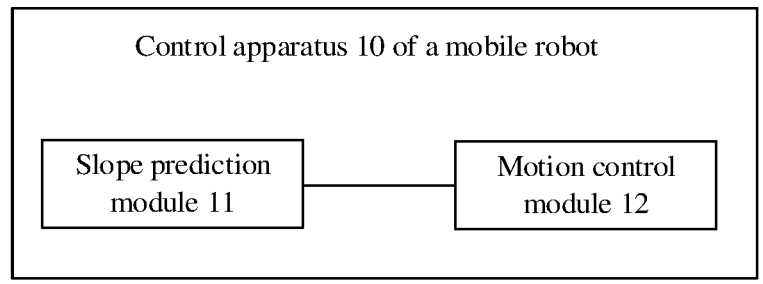
FIG. 7 is a schematic structural diagram of a control apparatus of a mobile robot according to an embodiment of the present application.

FIG. 7 is a schematic structural diagram of a control apparatus of a mobile robot according to an embodiment of the present application. As shown in FIG. 7, the control apparatus 10 of the mobile robot in the embodiment includes:

a slope prediction module 11 and a motion control module 12.

The slope prediction module 11 is configured to: when distance information obtained by a laser radar has an effective distance change, predict an inclination angle of a forward road section relative to a road surface where the mobile robot is currently located; and determine a slope of the forward road section based on the inclination angle and a pitch angle measured by an inertial measurement unit.

The motion control module 12 is configured to: control movement of the mobile robot based on the slope and a result of comparison between the slope and a slope threshold of the mobile robot; and mark the forward road section as a slope area on a slope map, where the slope map is used to control, based on the slope area when the mobile robot passes by the slope area, the mobile robot to send climbing warning information.

Optionally, the slope prediction module 11 is specifically configured to:

obtain a fixed distance to a current road surface measured by the laser radar at a first position and a measured distance to the forward road section measured by the laser radar at a second position; and calculate, based on the fixed distance and the measured distance, the inclination angle of the forward road section relative to the current road surface.

Optionally, the laser radar is a single-line radar; and the slope prediction module 11 is specifically configured to:

determine displacement of the mobile robot from the first position to the second position; and calculate, based on the displacement, the fixed distance, the measured distance, and a light emission angle, an inclination angle of the forward road section relative to the current road surface. The light emission angle is an included angle between a light beam emitted by the laser radar and the current road surface. Herein, the light emission angle may be an angle parameter of the light beam emitted by the laser radar.

Optionally, the laser radar is a multi-line radar; and the slope prediction module 11 is specifically configured to:

obtain a first fixed distance and a second fixed distance to the current road surface that are measured at the first position respectively by a first light beam and a second light beam emitted by the laser radar; and obtain a first measured distance and a second measured distance to the forward road section that are measured at the second position respectively by the first light beam and the second light beam emitted by the laser radar; and calculate, based on the first fixed distance, the second fixed distance, the first measured distance, the second measured distance, and a beam angle, the inclination angle of the forward road section relative to the current road surface. The beam angle is an included angle between the first light beam and the second light beam. Herein, the beam angle may be an angle parameter of the light beam emitted by the laser radar.

Optionally, the slope threshold includes a maximum uphill angle and a minimum downhill angle; and the motion control module 12 is specifically configured to:

determine an uphill downhill status of the forward road section depending on whether a value of the slope is positive or negative, where the uphill downhill status indicates that the forward road section is an uphill road section or a downhill road section;

if the forward road section is the uphill road section, determine whether the slope is less than the maximum uphill angle; and if the slope is less than the maximum uphill angle, control the mobile robot to go uphill.

Optionally, the motion control module 12 is specifically configured to:

determine a size relationship between the slope and the pitch angle, where the size relationship indicates that the slope is greater than, less than, or equal to the pitch angle; and if the slope is greater than the pitch angle, increase a tractive force of the mobile robot;

if the slope is less than the pitch angle, increase a speed of the mobile robot; or if the slope is equal to the pitch angle, keep the tractive force and the speed of the mobile robot unchanged.

Optionally, the motion control module 12 is further configured to:

if the forward road section is the downhill road section, determine whether the slope is greater than the minimum downhill angle; and if the slope is greater than the minimum downhill angle, control the mobile robot to go downhill.

Optionally, the motion control module 12 is specifically configured to:

determine a size relationship between the slope and the pitch angle, where the size relationship indicates that the slope is greater than, less than, or equal to the pitch angle; and if the slope is greater than the pitch angle, increase the tractive force of the mobile robot;

if the slope is less than the pitch angle, decrease the speed of the mobile robot; or if the slope is equal to the pitch angle, keep the tractive force and the speed of the mobile robot unchanged.

Optionally, the motion control module 12 is further configured to:

remove data of a measured distance obtained by the laser radar, which is greater than a distance threshold, and obtain the distance information by performing fitting.

Optionally, the climbing warning information includes a voice reminder or a light reminder.

Optionally, the motion control module 12 is further configured to:

when the mobile robot passes by the slope area, update the slope area if it is determined, based on the inclination angle and the pitch angle, that the forward road section has no slope.

The control apparatus of the mobile robot provided in the embodiment may execute the control method of the mobile robot provided in the foregoing method embodiment, and has functional modules and beneficial effects corresponding to the method. An implementation principle and a technical effect of the embodiment are similar to those of the foregoing method embodiment. Details are not described herein again.

Figure 8:
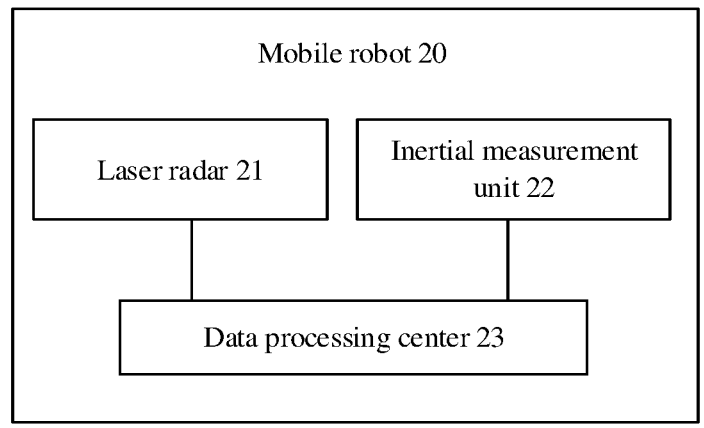
FIG. 8 is a schematic structural diagram of a mobile robot according to an embodiment of the present application.

FIG. 8 is a schematic structural diagram of a mobile robot according to an embodiment of the present application. As shown in FIG. 8, the mobile robot 20 includes:

a laser radar 21, an inertial measurement unit 22, and a data processing center 23. The laser radar 21 and the inertial measurement unit 22 are in communication connection with the data processing center 23 respectively, to send collected data to the data processing center 23.

The laser radar 21 may be a single-line laser radar or a multi-line laser radar. The laser radar is mounted parallel to a chassis of the mobile robot. There is a fixed included angle between a light beam emitted by the laser radar and flat ground. The laser radar is configured to measure a distance from the laser radar to a road surface.

The inertial measurement unit 22 is an apparatus for measuring an azimuth and an attitude of a moving carrier via an accelerometer and a gyroscope. In the embodiment, the inertial measurement unit is configured to measure a current pitch angle of the mobile robot, namely, an inclination angle of the mobile robot relative to a horizontal plane.

The data processing center 23 includes a memory, a processor, and a computer program stored in the memory and executable by the processor. The program, when executed by the processor, implements the control method of the mobile robot according to an embodiment. There may be one or more processors in the data processing center 23. The processor and the memory may be connected via a bus or in another manner.

The memory, as a computer-readable storage medium, may be configured to store a software program, a computer executable program, and a module, for example, a program instruction/module corresponding to the slope prediction module 11 and the motion control module 12 in the embodiments of the present application. The processor executes various functional applications and data processing of the mobile robot by running software programs, instructions, and modules stored in the memory, so as to realize the foregoing control method of the mobile robot.

The memory may mainly include a program storage area and a data storage area. The program storage area may store an operating system and application programs required for at least one function. The data storage area may store data created based on use of a terminal, and the like. In addition, the memory may include a high-speed random access memory, and may further include a nonvolatile memory, for example, at least one disk storage device, a flash memory, or other nonvolatile solid-state storage devices. In some examples, the memory may further include a memory remotely located relative to the processor, which may be connected to the mobile robot via a mesh. Examples of the foregoing mesh include, but are not limited to, the Internet, an Intranet, a local area network, a mobile communication network, and combinations thereof.

An embodiment of the present application further provides a computer-readable storage medium, storing a computer program. The computer program, when executed by a computer processor, performs a control method of a mobile robot. The method includes:

when distance information obtained by a laser radar has an effective distance change, predicting an inclination angle of a forward road section relative to a road surface where the mobile robot is currently located;

determining a slope of the forward road section based on the inclination angle and a pitch angle measured by an inertial measurement unit;

controlling movement of the mobile robot based on the slope and a result of comparison between the slope and a slope threshold of the mobile robot; and marking the forward road section as a slope area on a slope map, where the slope map is used to control, based on the slope area when the mobile robot passes by the slope area, the mobile robot to send climbing warning information.

Certainly, the computer program in the computer-readable storage medium according to the embodiment of the present application is not limited to the method operation described above, and may also perform related operations in the control method of the mobile robot according to any embodiment of the present application.

Figure 9:
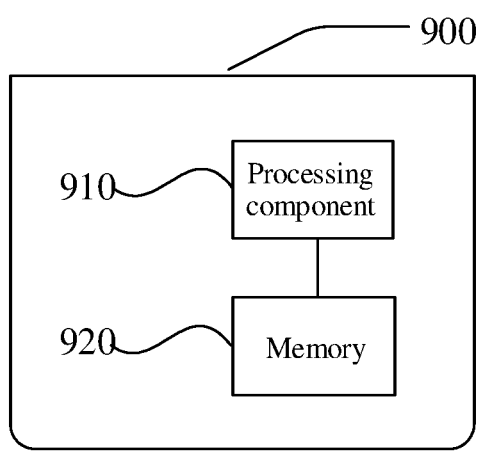
FIG. 9 is a block diagram of an electronic device configured to perform a control method of a mobile robot according to an embodiment of the present application.

FIG. 9 is a block diagram of an electronic device 900 configured to perform a control method of a mobile robot according to an embodiment of the present application.

Referring to FIG. 9, the electronic device 900 includes a processing component 910 that further includes one or more processors, and memory resources represented by a memory 920 for storing an instruction, for example, an application program, executable by the processing component 910. The application program stored in the memory 920 may include one or more modules each of which corresponds to a set of instructions. In addition, the processing component 910 is configured to execute an instruction to perform the foregoing control method of the mobile robot.

The electronic device 900 may further include: a power supply component, configured to perform power management of the electronic device 900; a wired or wireless network interface, configured to connect the electronic device 900 to a network; and an input/output (I/O) interface. The electronic device 900 may be operated based on an operating system stored in the memory 920, for example, Windows Server™, Mac OS X™, Unix™, Linux™, FreeBSD™, or the like.

According to the foregoing description of the implementations, those skilled in the art may clearly understand that the present application may be implemented by means of software and necessary general hardware. Certainly, the present application may also be implemented by hardware. However, in many cases, the former is a better implementation.

Based on such an understanding, the technical solutions of the present application essentially or the part contributing to the prior art may be implemented in a form of a software product. The computer software product may be stored in a computer-readable storage medium, for example, a computer floppy disk, a read-only memory (ROM), a random access memory (RAM), a flash, a hard disk, or an optical disk. The computer software product includes several instructions for instructing a computer device (which may be a personal computer, a server, a mesh device, or the like) to perform the methods described in the embodiments of the present application.

It should be noted that, all units and modules included in the embodiments of the foregoing control apparatus of the mobile robot are merely divided based on functional logic, but are not limited to the foregoing division, as long as the corresponding functions can be realized. In addition, the specific name of each functional unit is only for convenience of distinguishing from each other and is not intended to limit the protection scope of the present application.

It should be noted that the foregoing descriptions are only the examples of the present application and the technical principles applied thereto. Those skilled in the art will appreciate that the present application is not limited to the specific embodiments described herein, and various obvious modifications, changes, and substitutions can be made by those skilled in the art without departing from the protection scope of the present application. Therefore, although the present application is described in detail by using the foregoing embodiments, the present application is not limited to the foregoing embodiments. Other equivalent embodiments may also be included without departing from the concept of the present application. Therefore, the scope of the present application depends on the appended claims.

What is claimed is:

1. A control method of a mobile robot, wherein a laser radar and an inertial measurement unit are mounted on the mobile robot; the laser radar is configured to measure a distance from the laser radar to a road surface; the inertial measurement unit is configured to measure a current pitch angle of the mobile robot; and the method comprises:

when distance information obtained by the laser radar has an effective distance change, obtaining a fixed distance to a current road surface measured by the laser radar at a first position and a measured distance to a forward road section measured by the laser radar at a second position;

predicting, based on the fixed distance, the measured distance, and an angle parameter of a light beam emitted by the laser radar, an inclination angle of the forward road section relative to the current road surface where the mobile robot is currently located;

determining a slope of the forward road section based on the inclination angle and the pitch angle;

controlling movement of the mobile robot based on the slope and a result of comparison between the slope and a slope threshold of the mobile robot; and marking the forward road section as a slope area on a slope map, wherein the slope map is used to control, based on the slope area when the mobile robot passes by the slope area, the mobile robot to send climbing warning information.

2. The method according to claim 1, wherein the predicting, based on the fixed distance, the measured distance, and an angle parameter of a light beam emitted by the laser radar, an inclination angle of the forward road section relative to the current road surface where the mobile robot is currently located comprises:

determining displacement of the mobile robot from the first position to the second position; and calculating, based on the displacement, the fixed distance, the measured distance, and an included angle between the current road surface and the light beam emitted by the laser radar, the inclination angle of the forward road section relative to the current road surface.

3. The method according to claim 1, wherein the laser radar is a multi-line radar; and the obtaining a fixed distance to a current road surface measured by the laser radar at a first position and a measured distance to a forward road section measured by the laser radar at a second position comprises:

obtaining a first fixed distance and a second fixed distance to the current road surface that are measured at the first position respectively by a first light beam and a second light beam emitted by the laser radar; and obtaining a first measured distance and a second measured distance to the forward road section that are measured at the second position respectively by the first light beam and the second light beam emitted by the laser radar;

wherein the predicting, based on the fixed distance, the measured distance, and an angle parameter of a light beam emitted by the laser radar, an inclination angle of the forward road section relative to the current road surface where the mobile robot is currently located comprises:

calculating, based on the first fixed distance, the second fixed distance, the first measured distance, the second measured distance, and an included angle between the first light beam and the second light beam, the inclination angle of the forward road section relative to the current road surface.

4. The method according to claim 1, wherein the slope threshold comprises a maximum uphill angle and a minimum downhill angle; and the controlling movement of the mobile robot based on the slope and a result of comparison between the slope and a slope threshold of the mobile robot comprises:

determining an uphill downhill status of the forward road section depending on whether a value of the slope is positive or negative, wherein the uphill downhill status indicates that the forward road section is an uphill road section or a downhill road section;

if the forward road section is the uphill road section, determining whether the slope is less than the maximum uphill angle; and if the slope is less than the maximum uphill angle, controlling the mobile robot to go uphill.

5. The method according to claim 4, wherein the controlling the mobile robot to go uphill comprises:

determining a size relationship between the slope and the pitch angle, wherein the size relationship indicates that the slope is greater than, less than, or equal to the pitch angle; and if the slope is greater than the pitch angle, increasing a tractive force of the mobile robot;

if the slope is less than the pitch angle, increasing a speed of the mobile robot; or if the slope is equal to the pitch angle, keeping the tractive force and the speed of the mobile robot unchanged.

6. The method according to claim 4, wherein the method further comprises:

if the forward road section is the downhill road section, determining whether the slope is greater than the minimum downhill angle; and if the slope is greater than the minimum downhill angle, controlling the mobile robot to go downhill.

7. The method according to claim 1, wherein the method further comprises:

removing data of a measured distance obtained by the laser radar, which is greater than a distance threshold, and obtaining the distance information by performing fitting.

8. The method according to claim 1, wherein the climbing warning information comprises a voice reminder or a light reminder.

9. The method according to claim 1, wherein the method further comprises:

when the mobile robot passes by the slope area, updating the slope area if it is determined, based on the inclination angle and the pitch angle, that the forward road section has no slope.

10. A mobile robot, comprising:

a laser radar, configured to measure a distance from the laser radar to a road surface;

an inertial measurement unit, configured to measure a current pitch angle of the mobile robot; and a data processing center, comprising a memory, a processor, and a computer program stored in the memory and executable by the processor, wherein the program, when executed by the processor, implements a control method of the mobile robot, the control method of the mobile robot comprises:

when distance information obtained by the laser radar has an effective distance change, obtaining a fixed distance to a current road surface measured by the laser radar at a first position and a measured distance to a forward road section measured by the laser radar at a second position;

predicting, based on the fixed distance, the measured distance, and an angle parameter of a light beam emitted by the laser radar, an inclination angle of the forward road section relative to the current road surface where the mobile robot is currently located;

determining a slope of the forward road section based on the inclination angle and the pitch angle;

controlling movement of the mobile robot based on the slope and a result of comparison between the slope and a slope threshold of the mobile robot; and marking the forward road section as a slope area on a slope map, wherein the slope map is used to control, based on the slope area when the mobile robot passes by the slope area, the mobile robot to send climbing warning information.

11. The mobile robot according to claim 10, wherein the predicting, based on the fixed distance, the measured distance, and an angle parameter of a light beam emitted by the laser radar, an inclination angle of the forward road section relative to the current road surface where the mobile robot is currently located comprises:

determining displacement of the mobile robot from the first position to the second position; and calculating, based on the displacement, the fixed distance, the measured distance, and an included angle between the current road surface and the light beam emitted by the laser radar, the inclination angle of the forward road section relative to the current road surface.

12. The mobile robot according to claim 10, wherein the laser radar is a multi-line radar; and the obtaining a fixed distance to a current road surface measured by the laser radar at a first position and a measured distance to a forward road section measured by the laser radar at a second position comprises:

obtaining a first fixed distance and a second fixed distance to the current road surface that are measured at the first position respectively by a first light beam and a second light beam emitted by the laser radar; and obtaining a first measured distance and a second measured distance to the forward road section that are measured at the second position respectively by the first light beam and the second light beam emitted by the laser radar;

wherein the predicting, based on the fixed distance, the measured distance, and an angle parameter of a light beam emitted by the laser radar, an inclination angle of the forward road section relative to the current road surface where the mobile robot is currently located comprises:

calculating, based on the first fixed distance, the second fixed distance, the first measured distance, the second measured distance, and an included angle between the first light beam and the second light beam, the inclination angle of the forward road section relative to the current road surface.

13. The mobile robot according to claim 10, wherein the slope threshold comprises a maximum uphill angle and a minimum downhill angle; and the controlling movement of the mobile robot based on the slope and a result of comparison between the slope and a slope threshold of the mobile robot comprises:

determining an uphill downhill status of the forward road section depending on whether a value of the slope is positive or negative, wherein the uphill downhill status indicates that the forward road section is an uphill road section or a downhill road section;

if the forward road section is the uphill road section, determining whether the slope is less than the maximum uphill angle; and if the slope is less than the maximum uphill angle, controlling the mobile robot to go uphill.

14. The mobile robot according to claim 13, wherein the controlling the mobile robot to go uphill comprises:

determining a size relationship between the slope and the pitch angle, wherein the size relationship indicates that the slope is greater than, less than, or equal to the pitch angle; and if the slope is greater than the pitch angle, increasing a tractive force of the mobile robot;

if the slope is less than the pitch angle, increasing a speed of the mobile robot; or if the slope is equal to the pitch angle, keeping the tractive force and the speed of the mobile robot unchanged.

15. The mobile robot according to claim 13, wherein the control method of the mobile robot further comprises:

if the forward road section is the downhill road section, determining whether the slope is greater than the minimum downhill angle; and if the slope is greater than the minimum downhill angle, controlling the mobile robot to go downhill.

16. The mobile robot according to claim 10, wherein the control method of the mobile robot further comprises:

removing data of a measured distance obtained by the laser radar, which is greater than a distance threshold, and obtaining the distance information by performing fitting.

17. The mobile robot according to claim 10, wherein the climbing warning information comprises a voice reminder or a light reminder.

18. The mobile robot according to claim 10, wherein the control method of the mobile robot further comprises:

when the mobile robot passes by the slope area, updating the slope area if it is determined, based on the inclination angle and the pitch angle, that the forward road section has no slope.

19. A non-transitory computer-readable storage medium, storing a computer program, wherein the program, when executed by a processor, implements a control method of a mobile robot, the control method of the mobile robot comprises:

when distance information obtained by the laser radar has an effective distance change, obtaining a fixed distance to a current road surface measured by the laser radar at a first position and a measured distance to a forward road section measured by the laser radar at a second position;

predicting, based on the fixed distance, the measured distance, and an angle parameter of a light beam emitted by the laser radar, an inclination angle of the forward road section relative to the current road surface where the mobile robot is currently located;

determining a slope of the forward road section based on the inclination angle and the pitch angle;

controlling movement of the mobile robot based on the slope and a result of comparison between the slope and a slope threshold of the mobile robot; and marking the forward road section as a slope area on a slope map, wherein the slope map is used to control, based on the slope area when the mobile robot passes by the slope area, the mobile robot to send climbing warning information.

* * * * *